United States Patent
Arliguie et al.

(10) Patent No.: US 11,724,963 B2
(45) Date of Patent: Aug. 15, 2023

(54) PHARMACEUTICAL PACKAGES WITH COATINGS COMPRISING POLYSILAZANE

(71) Applicant: CORNING INCORPORATED, Corning, NY (US)

(72) Inventors: Therese Francoise Arliguie, Corning, NY (US); Huayun Deng, Painted Post, NY (US); Richard Allen Hayes, Beaumont, TX (US); Kevin Robert McCarthy, Horseheads, NY (US); Weijun Niu, Painted Post, NY (US); Frederic Christian Wagner, Lindley, NY (US)

(73) Assignee: CORNING INCORPORATED, Corning, NY (US)

( * ) Notice: Subject to any disclaimer, the term of this patent is extended or adjusted under 35 U.S.C. 154(b) by 371 days.

(21) Appl. No.: 16/858,166

(22) Filed: Apr. 24, 2020

(65) Prior Publication Data
US 2020/0346970 A1    Nov. 5, 2020

Related U.S. Application Data

(60) Provisional application No. 62/841,446, filed on May 1, 2019.

(51) Int. Cl.
*A61J 1/06* (2006.01)
*A61J 1/14* (2023.01)
(Continued)

(52) U.S. Cl.
CPC ............. *C03C 17/005* (2013.01); *A61J 1/065* (2013.01); *A61J 1/1468* (2015.05);
(Continued)

(58) Field of Classification Search
CPC ................ B65D 23/08; B65D 23/0807; B65D 23/0814; B65D 23/0821; A61J 1/05;
(Continued)

(56) References Cited

U.S. PATENT DOCUMENTS 5,709,741 A * 1/1998 Akamatsu ................ C09D 4/00
106/287.11
5,922,411 A * 7/1999 Shimizu ............ H01L 21/02343
428/688

(Continued)

FOREIGN PATENT DOCUMENTS

WO    2011/121811 A1    10/2011

OTHER PUBLICATIONS

Gilvan Barroso, Quan Li, Rajendra K. Bordia, and Gunter Motz. "Polymeric and ceramic silicon-based coatings—a review". Journal of Materials Chemistry A, 2019, 7, pp. 1936-1963 (Year: 2018).*

(Continued)

*Primary Examiner* — Michael C Romanowski
(74) *Attorney, Agent, or Firm* — Michael G. Panian (57) ABSTRACT

The present disclosure is directed to pharmaceutical packages that include a coating that comprises polysilazane, and methods for the production of such. In one or more embodiments of the present disclosure, a pharmaceutical package may include a glass container comprising a first surface and a second surface opposite the first surface. The first surface may be an outer surface of the glass container. The pharmaceutical package may further include a coating positioned over at least a portion of the first surface of the glass container. The coating may include polysilazane.

17 Claims, 4 Drawing Sheets

(51) Int. Cl.
  *B65D 1/02* (2006.01)
  *B65D 23/08* (2006.01)
  *C03C 17/00* (2006.01)
  *C03C 17/30* (2006.01)

(52) U.S. Cl.
  CPC ....... *B65D 1/0215* (2013.01); *B65D 23/0821* (2013.01); *C03C 17/30* (2013.01); *C03C 2217/78* (2013.01)

(58) Field of Classification Search
  CPC ... A61J 1/06; A61J 1/062; A61J 1/065; C03C 17/005; C03C 17/30; C03C 17/32; C03C 2217/75; C03C 2217/76; C03C 2217/78; C09D 183/16
  USPC .......................... 428/34.4, 34.7, 34.1–36.92
  See application file for complete search history.

(56) References Cited

U.S. PATENT DOCUMENTS

| | | | |
|---|---|---|---|
| 7,344,603 B2 | 3/2008 | Shimizu et al. | |
| 7,754,003 B2 | 7/2010 | Aoki et al. | |
| 8,088,350 B2 | 1/2012 | Betz et al. | |
| 8,329,830 B2 | 12/2012 | Yang et al. | |
| 8,557,901 B2 | 10/2013 | Ozaki | |
| 8,889,229 B2 | 11/2014 | Nagahara et al. | |
| 9,029,071 B2 | 5/2015 | Shinde et al. | |
| 9,082,612 B2 | 7/2015 | Yun et al. | |
| 9,534,145 B2 | 1/2017 | Ozaki et al. | |
| 9,567,488 B2 | 2/2017 | Fish | |
| 9,624,128 B1 | 4/2017 | Click et al. | |
| 9,668,936 B2 | 6/2017 | Fadeev et al. | |
| 9,676,946 B2 | 6/2017 | Margaillan et al. | |
| 9,744,099 B2 | 8/2017 | Fadeev et al. | |
| 9,763,852 B2 | 9/2017 | Fadeev et al. | |
| 9,775,775 B2 | 10/2017 | Fadeev et al. | |
| 9,856,400 B2 | 1/2018 | Fish et al. | |
| 9,896,764 B2 | 2/2018 | Ozaki et al. | |
| 9,918,898 B2 | 3/2018 | Fadeev et al. | |
| 9,991,182 B2 | 6/2018 | Grottenmüller et al. | |
| 9,994,732 B1 | 6/2018 | Johnson | |
| 10,034,816 B2 | 7/2018 | Fadeev et al. | |
| 10,093,830 B2 | 10/2018 | Lim et al. | |
| 10,093,831 B2 | 10/2018 | Yamakawa et al. | |
| 10,106,687 B2 | 10/2018 | Yun et al. | |
| 10,138,381 B2 | 11/2018 | Fish | |
| 2013/0302526 A1* | 11/2013 | Fish | C09D 5/18 252/62 |
| 2014/0199544 A1* | 7/2014 | Naganawa | C09D 183/16 428/336 |
| 2014/0251859 A1* | 9/2014 | Weikart | A61L 31/16 206/524.9 |
| 2015/0060444 A1* | 3/2015 | Wang | C03C 17/22 65/17.2 |
| 2016/0251260 A1 | 9/2016 | Bayne et al. | |
| 2017/0121058 A1 | 5/2017 | Henry et al. | |
| 2017/0348192 A1 | 12/2017 | Fadeev et al. | |
| 2018/0116907 A1 | 5/2018 | Fadeev et al. | |
| 2018/0303708 A1 | 10/2018 | Fadeev et al. | |
| 2018/0318169 A1 | 11/2018 | Fadeev et al. | |
| 2019/0119151 A1* | 4/2019 | Kim | C03C 17/30 |
| 2019/0119506 A1* | 4/2019 | Kim | B32B 27/283 |

OTHER PUBLICATIONS

International Search Report and Written Opinion of the International Searching Authority; PCT/US2020/030174; dated Aug. 25, 2020; 8 Pages; European Patent Office.

Wang et al., "Oligosilazane cured by moisture as fluorine-free hydrophobic coating for waterproof polymer-matrix composite materials", Journal of Coatings Technology and Research, vol. 15, Issue 6, 2018, pp. 1251-1258.

* cited by examiner

PHARMACEUTICAL PACKAGES WITH COATINGS COMPRISING POLYSILAZANE

CROSS REFERENCE TO RELATED APPLICATIONS

This application claims the benefit of priority under 35 U.S. § 120 of U.S. Provisional Application Ser. No. 62/841,446 filed on May 1, 2019, the content of which is relied upon and incorporated herein by reference in its entirety.

BACKGROUND

Field

The present specification generally relates to glass articles and, more specifically, to coated glass articles such as pharmaceutical packages.

Technical Background

Historically, glass has been used as the preferred material for packaging pharmaceuticals because of its hermeticity, optical clarity, and excellent chemical durability relative to other materials. Specifically, the glass used in pharmaceutical packaging should have adequate chemical durability so as not to affect the stability of the pharmaceutical compositions contained therein. Glasses having suitable chemical durability for many pharmaceutical applications include those glass compositions within the ASTM standard 'Type 1B' which have a proven history of chemical durability.

However, use of glass for such applications is limited by the mechanical performance of the glass. In the pharmaceutical industry, glass breakage is a safety concern for the end user, as the broken package and/or the contents of the package may injure the end user. Glass breakages on the filling line also cause costly loss of drug or even potential recalls due to faulty packaging or broken glass being contained in neighboring sealed packages from the filling line. Further, non-catastrophic breakage (i.e., when the glass cracks but does not break) may cause the contents to lose their sterility which, in turn, may result in costly product recalls.

Specifically, the high processing speeds utilized in the manufacture and filling of glass pharmaceutical packages may result in mechanical damage on the surface of the package, such as abrasions, as the packages come into contact with processing equipment, handling equipment, and/or other packages. This mechanical damage significantly decreases the strength of the glass pharmaceutical package resulting in an increased likelihood that cracks will develop in the glass, potentially compromising the sterility of the pharmaceutical contained in the package or causing the complete failure of the package.

One approach to improving the mechanical durability of the glass package is to thermally and/or chemically temper the glass package. Thermal tempering strengthens glass by inducing a surface compressive stress during rapid cooling after forming. This technique works well for glass articles with flat geometries (such as windows), glass articles with thicknesses greater than about 2 mm, and glass compositions with high thermal expansion. However, pharmaceutical glass packages typically have complex geometries (vial, tubular, ampoule, etc.), thin walls (sometimes between about 1-1.5 mm), and are produced from low expansion glasses, making glass pharmaceutical packages unsuitable for strengthening by conventional thermal tempering. Chemical tempering also strengthens glass by the introduction of surface compressive stress. The stress is introduced by submerging the article in a molten salt bath. As ions from the glass are replaced by larger ions from the molten salt, a compressive stress is induced in the surface of the glass. The advantage of chemical tempering is that it can be used on complex geometries, thin samples, and is relatively insensitive to the thermal expansion characteristics of the glass substrate.

However, while the aforementioned tempering techniques improve the ability of the strengthened glass to withstand blunt impacts, these techniques are less effective in improving the resistance of the glass to abrasions, such as scratches, which may occur during manufacturing, shipping and handling. Such defects may make the glass more susceptible to breakage. Accordingly, a need exists for alternative glass articles which have improved resistance to mechanical damage.

SUMMARY

In one or more embodiments of the present disclosure, a pharmaceutical package may comprise a glass container comprising a first surface and a second surface opposite the first surface. The first surface may be an outer surface of the glass container. The pharmaceutical package may further comprise a coating positioned over at least a portion of the first surface of the glass container. The coating may comprise one or more polysilazanes.

In one or more additional embodiments of the present disclosure, a pharmaceutical package may comprise a glass container comprising a first surface and a second surface opposite the first surface. The first surface may be an outer surface of the glass container. The pharmaceutical package may further comprise a coating positioned over at least a portion of the first surface of the glass container. The coating may comprise a polymer formed from silazane monomeric units or prepolymers comprising silazane monomeric units.

In yet one or more additional embodiments of the present disclosure, a coated pharmaceutical package may be produced by a method which may comprise depositing a coating precursor mixture onto a first surface of an outer surface of a glass container, and heating the coating precursor mixture to form a coating on the outer surface of the glass container. The coating precursor mixture may comprise one or more silazane monomeric units or prepolymers comprising silazane monomeric units, and the coating may comprise one or more polysilazanes.

Additional features and advantages of the coatings that may be used for coating glass article, coated glass articles, and methods and processes for manufacturing the same will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to various embodiments of coatings, glass articles with coatings, and methods for producing the same, examples of which are schematically depicted in the figures. Such coated glass articles may be glass containers suitable for use in various packaging applications including, without limitation, as pharmaceutical packages. It should be understood that coated glass articles may refer to coated pharmaceutical packages as described in this disclosure. In one or more embodiments, the coatings and/or the coated pharmaceutical packages are thermally stable when, after initial coating application and curing, they are exposed to high temperatures such as those utilized during a depyrogenation process. For example, the coated glass articles described herein may sufficiently retain their low coefficient of friction following a thermal treatment and/or may not substantially yellow in color following such a thermal treatment. These pharmaceutical packages may or may not contain a pharmaceutical composition. In one or more embodiments, the coatings may comprise one or more polysilazanes. In some embodiments, the entire coating may be polysilazane. In one or more embodiments, the coatings may be low-friction coatings, such as those which have a coefficient of friction which is less than that of bare glass, such as less than 0.7. In one or more embodiments presently disclosed, the coatings that include polysilazane may have desirable functionality and/or properties as compared with other polymer materials that may be available for coatings on pharmaceutical packaging. For example, coatings which comprise or consist of polysilazane may provide for reduced coefficient of friction, improved adhesion without the use of a silane coupling agent, and/or solubility in non-toxic solvents during application, as compared with coatings made from other classes of polymers.

Various embodiments of the coatings, glass articles with coatings, and methods for forming the same will be described in further detail herein with specific reference to the appended drawings. While embodiments of the coatings described herein are applied to the outer surface of a glass container, it should be understood that the coatings described may be used as a coating on a wide variety of materials, including non-glass materials and on substrates other than containers including, without limitation, glass display panels and the like.

Generally, a coating may be applied to a surface of a glass article, such as a container that may be used as a pharmaceutical package. The coating may provide advantageous properties to the coated glass article such as a reduced coefficient of friction and increased damage resistance. The reduced coefficient of friction may impart improved strength and durability to the glass article by mitigating frictive damage to the glass. Further, the coating may maintain the aforementioned improved strength and durability characteristics following exposure to elevated temperatures and other conditions, such as those experienced during packaging and pre-packaging steps utilized in packaging pharmaceuticals, such as, for example, depyrogenation, lyophilization, autoclaving and the like. Accordingly, the coatings and glass articles with the coating may be thermally stable at conditions such as those utilized in depyrogenation.

Figure 1:
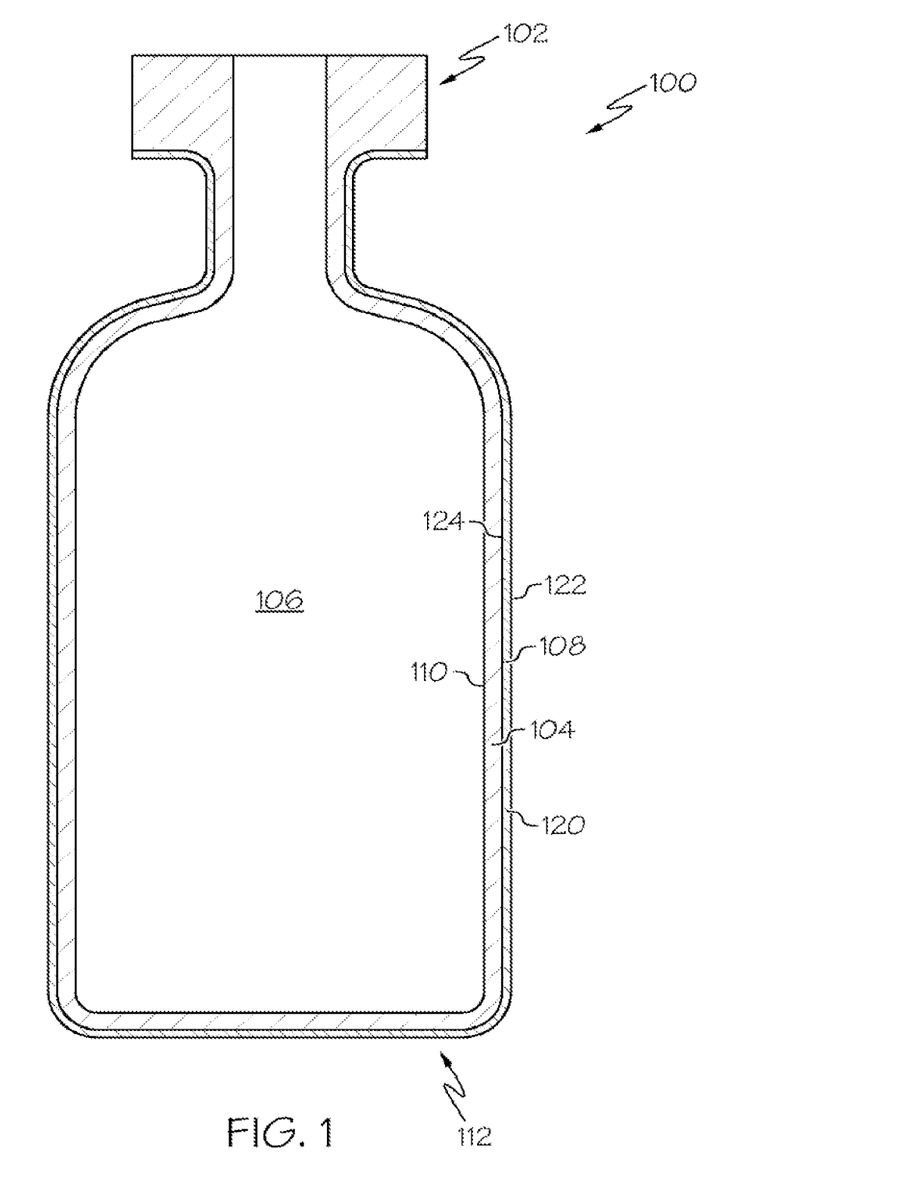
FIG. 1 schematically depicts a cross sectional view of a glass container with a low-friction coating, according to one or more embodiments shown and described herein.

FIG. 1 schematically depicts a cross section of a coated glass article, specifically a coated glass container 100. The coated glass container 100 comprises a glass body 102 and a coating 120. The glass body 102 has a glass container wall 104 extending between an exterior surface 108 (i.e., a first surface) and an interior surface 110 (i.e., a second surface). The interior surface 110 of the glass container wall 104 defines an interior volume 106 of the coated glass container 100. A coating 120 is positioned on at least a portion of the exterior surface 108 of the glass body 102. As used herein, a coating may be "positioned on" a substrate while not in direct contact with the substrate, such as if an intermediate layer is present between the substrate and a coating positioned over that substrate. In some embodiments, the coating 120 may be positioned on substantially the entire exterior surface 108 of the glass body 102. In some embodiments, such as depicted in FIG. 1, the coating 120 may be in direct contact with (i.e., bonded to) the glass body 102 at the exterior surface 108. The coating 120 has an outer surface 122 and a glass body contacting surface 124 at the interface of the glass body 102 and the coating 120. In some additional embodiments, the coating 120 may extend to cover (partially or entirely) the interior of the glass body 102.

In one or more embodiments, the coated glass container 100 is a pharmaceutical package. For example, the glass body 102 may be in the shape of a vial, ampoule, ampul, ampule, bottle, flask, phial, beaker, bucket, carafe, vat, syringe body, or the like. The coated glass container 100 may be used for containing any composition, and in one embodiment, may be used for containing a pharmaceutical composition. A pharmaceutical composition may include any chemical substance intended for use in the medical diagnosis, cure, treatment, or prevention of disease. Examples of pharmaceutical compositions include, but are not limited to, medicines, drugs, medications, medicaments, remedies, and the like. The pharmaceutical composition may be in the form of a liquid, solid, gel, suspension, powder, or the like.

Figure 2:
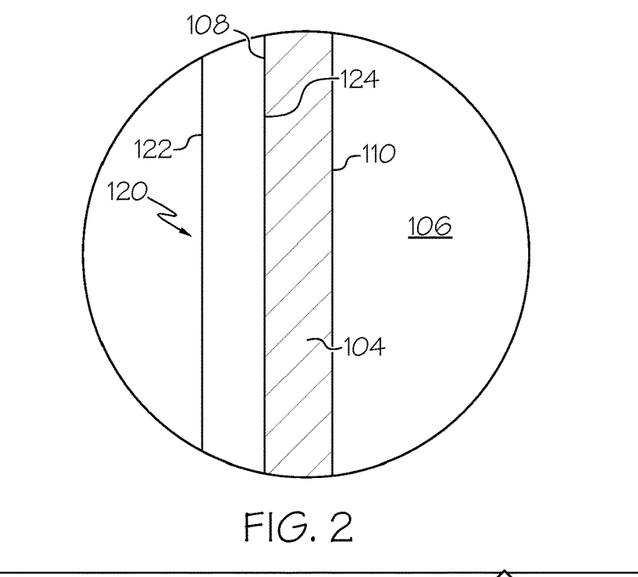
FIG. 2 schematically depicts an enlarged cross sectional view of the glass container of FIG. 1 with a mono-layer low-friction coating, according to one or more embodiments shown and described herein.

Now referring to FIGS. 1 and 2, in one embodiment, the coating 120 comprises a single-layered structure sometimes referred to herein as a "mono-layer" structure. For example, the coating 120 may have a substantially homogenous composition of polysilazane alone, or polysilazane mixed with one or more additional components. If two or more components are included in the coating 120, the coating 120 may be mixed but not fully homogenous. For example, in one or more embodiments, one or more chemical constituents of the mixture may congregate at an interface of the coating 120 (e.g., the interface with the glass body 102 or the outer surface 122). In such an embodiment, the local concentration of a chemical constituent may differ over different areas of the coating 120. However, it should be understood that the term "mixed" as used herein refers to layers that have at least some dispersion of at least two chemical components, and includes layers that are not fully homogenous. Generally, a mixed layer is deposited as a mixture of two or more chemical constituents contained in a coating precursor mixture.

As noted herein, the coating 120 includes one or more polysilazanes. In general, polysilazanes are polymers which include silicon and nitrogen, which form the polymer backbone. The backbone includes alternating silicon and nitrogen, sometimes forming ring structures where each nitrogen atom may be bonded with up to three silicon atoms, and vice versa. The polysilazane may further include to one or more organic functional groups which are bound to the polymer backbone. Polysilazanes may be expressed, in one or more embodiments, as $[R^1R^2Si—NR^3]_n$, where $R^1$, $R^2$, and $R^3$ may each be hydrogen atoms or organic functional groups, n is the number of repeating monomeric units. In embodiments where $R^1$, $R^2$, and $R^3$ are hydrogen, an inorganic molecule is formed, sometimes referred to as perhydropolysilazane or polyperhydridosilazane. An example structure of perhydropolysilazane is shown in Chemical structure #1.

Chemical Structure #1

In one or more embodiments, the coating may comprise polysilazanes which comprise polymeric chains, rings, three-dimensional crosslinking, or combinations of these. For example, rings of alternating silicon and nitrogen atoms may be bound into complex geometries, which may have an effect on the shape of the macromolecule.

In additional embodiments, one or more of $R^1$, $R^2$, and $R^3$ in the representative structure $[R^1R^2Si—NR^3]_n$ are organic moieties, where such polysilazanes may be referred to as organopolysilazanes. Organic moieties in the polysilazane may have an effect on the structure and properties of the polysilazane. Tuning of the amount and type or organic moieties present may be achieved by the selection of organic moiety and amount of organic moiety included. For example, one such embodiment is a polysilazane formed from 1,1-dimethylsilazane monomeric units or telomers. Chemical Structure #2, below, depicts poly(1,1-dimethylsilazane) telomer, where in the representative structure $[R^1R^2Si—NR^3]_n$, $R_1$ and $R_2$ are methyl groups and $R_3$ is hydrogen, and n is representative of the number of repeating monomeric units of the telomer. In additional embodiments, any of $R^1$, $R^2$, or $R^3$ may be alkyl groups (such as methyl, ethyl, propyl, or larger alkyl groups, straight chained or branched, including those comprising ring structures), or other hydrocarbyl groups such as those containing double bonds, aromatic rings, and/or heteroatoms. Heteroatoms refer to non-carbon and hydrogen atoms in an organic structure. In some embodiments, the polysilazane does not include halogen atoms.

Chemical Structure #2

In additional embodiments, the polysilazane may comprise a structure shown in Chemical Structure #3. Such a polysilazane is polyorganosilazane which includes at least three different monomeric units. The amount of X, Y, and Z in the formulation of Chemical Structure #3 may be varied.

Chemical Structure #3

R: H or CH₃

Without limitation, example silazane monomeric or telomeric units which are contemplated herein include 1,1,3,3-Tetramethyldisilazane, Hexamethyldisilazane, 2,2,4,4,6,6-Hexamethylcyclotrisilazane, 1,3-Diethyl-1,1,3,3-tetramethyldisilazane, 2,4,6-Trimethyl-2,4,6-trivinylcyclotrisilazane, 1,1,3,3-Tetramethyl-1,3-diphenyldisilazane, and 1,3-Dimethyl-1,1,3,3-tetraphenyldisilazane. It should be understood that in some embodiments, two or more silazane monomeric or telomeric units may be utilized to form a copolymer of silazane, which may be a material of pure polysilazane or a material of mixed polysilazane with other materials, as is described in embodiments herein.

In one or more embodiments, the polysilazanes of the coating 120 are thermally stable polymers that will not degrade significantly or at all, and remain adhered to the glass surface when exposed to temperatures suitable for depyrogenation, such as at least about 250° C., at least about 260° C., at least about 280° C., or even at least about 300° C. for about 30 minutes. Polysilazanes, as described herein, include polymers formed from one or more silazanes. In additional embodiments, the polysilazane may be formed from prepolymers which include telomers of silazanes. Prepolymers refer to partially polymerized substances which are further polymerized to form the polysilazane in the coating 120. Coatings 120 which comprise polysilazanes, as presently described, also include copolymers which include one or more silazane units along with other, non-silazane monomers or telomers. For example, the polysilazane may be a homopolymer formed from a single silazane species as monomeric units, copolymers (both random or block) which are formed from two or more silazane species, or copolymers which include some polysilazane backbone structure while additionally including other monomeric species, as is described herein.

The polysilazane may be formed by polymerization means such as curing by heating or other methods, which utilize monomers or prepolymers, or the combination thereof. In additional embodiments, curing may be self-induced by rest at room temperatures.

The coating 120 may comprise at least 5 wt. %, at least 10 wt. %, at least 15 wt. %, at least 20 wt. %, at least 30 wt. %, at least 40 wt. %, at least 50 wt. %, at least 60 wt. %, at least 70 wt. %, at least 80 wt. %, at least 90 wt. %, at least 95 wt. %, at least 98 wt. %, at least 99 wt. %, or even at least 99.9 wt. % of polysilazane, which may be derived from silazane monomers or prepolymers. The portion of the coating derived from any single species of silazane may be at least 5 wt. %, at least 10 wt. %, at least 15 wt. %, at least 20 wt. %, at least 30 wt. %, at least 40 wt. %, at least 50 wt. %, at least 60 wt. %, at least 70 wt. %, at least 80 wt. %, at least 90 wt. %, at least 95 wt. %, at least 98 wt. %, at least 99 wt. %, or even at least 99.9 wt. % of the total weight of the polysilazane.

In additional embodiments, the coating 120 may comprise polysilazane in a mixture with other chemical constituents such as silanes and/or siloxanes. The polysilazane of the coatings 120 may be directly bonded with the one or more silanes or siloxanes. Without being bound by theory, it is believed that the mixing of polysilazane with siloxanes (including polysiloxanes), silanes (including polysilanes), or both, may improve properties of the coating such as coefficient of friction, thermal stability, etc. In one or more embodiments, the coating 120 may comprise less than or equal to 10 wt. %, less than or equal to 20 wt. %, less than or equal to 30 wt. %, less than or equal to 40 wt. %, less than or equal to 50 wt. %, less than or equal to 60 wt. %, less than or equal to 70 wt. %, less than or equal to 80 wt. %, less than or equal to 90 wt. %, or less than or equal to 95 wt. % of polysilazane or material derived from silazane monomeric units or prepolymers. In some embodiments, the coating 120 may comprise at least 10 wt. %, at least 20 wt. %, at least 30 wt. %, at least 40 wt. %, at least 50 wt. %, at least 60 wt. %, at least 70 wt. %, at least 80 wt. %, at least 90 wt. %, at least 95 wt. % of polysilane or material derived from silane monomeric units or prepolymers. In some embodiments, the coating 120 may comprise at least 10 wt. %, at least 20 wt. %, at least 30 wt. %, at least 40 wt. %, at least 50 wt. %, at least 60 wt. %, at least 70 wt. %, at least 80 wt. %, at least 90 wt. %, at least 95 wt. % of polysilazane or material derived from siloxane monomeric units or prepolymers. Determination of percentage of polysilane, polysiloxane, or polysilazane may generally be determined by the weight ratio of silane, siloxane, and/or silazane present in the coating solution.

Contemplated polysilazane containing coatings may be formed from, without limitation, HS class formulations (such as HS-900, HS-907, HS-908, HS-924) commercially available from Huntington Specialty Materials, Durazane class formulations commercially available from Merck KGaA, Aquamica NL110A-20 commercially available from Merck, Kadko polysilazane coatings available from Kadko, Inc., and Q2 series coatings commercially available from Gyeon of Singapore.

In one or more embodiments, the coating 120 comprises one or more polysiloxanes. In some embodiments, silicone resins may form the polysiloxanes. The silicone resin may be a highly branched 3-dimensional polymer which is formed by branched, cage-like oligosiloxanes with the general formula of $R_nSi(X)_mO_y$, where R is a non reactive substituent, usually methyl or phenyl, and X is OH or H. While not wishing to be bound by theory, it is believed that curing of the resin occurs through a condensation reaction of Si—OH moieties with a formation of Si—O—Si bonds. The silicone resin may have at least one of four possible functional siloxane monomeric units, which include M-resins, D-resins, T-resins, and Q-resins, wherein M-resins refer to resins with the general formula $R_3SiO$, D-resins refer to resins with the general formula $R_2SiO_2$, T-resins refer to resins with the general formula $RSiO_3$, and Q-resins refer to resins with the general formula $SiO_4$ (a fused quartz). In some embodiments resins are made of D and T units (DT resins) or from M and Q units (MQ resins). In other embodiments, other combinations (MDT, MTQ, QDT) are also used.

In one or more embodiments, the coating 120 comprises one or more polysilanes formed from silanes. Combinations of different silanes may be utilized. In one or more embodiments, silanes may be aromatic chemical compositions. As used herein, an aromatic chemical composition contains one or more six-carbon rings characteristic of the benzene series and related organic moieties. The aromatic silane chemical composition may be an alkoxysilane such as, but not limited to, a dialkoxysilane chemical composition, hydrolysate thereof, or oligomer thereof, or a trialkoxysilane chemical composition, hydrolysate thereof, or oligomer thereof. In some embodiments, the aromatic silane may comprise an amine moiety, and may be an alkoxysilane comprising an amine moiety. In another embodiment, the aromatic silane chemical composition may be an aromatic alkoxysilane chemical composition, an aromatic acyloxysilane chemical composition, an aromatic halogen silane chemical composition, or an aromatic aminosilane chemical composition. In another embodiment, the aromatic silane chemical composition may be selected from the group consisting of aminophenyl, 3-(m-aminophenoxy) propyl, N-phenylaminopropyl, or (chloromethy) phenyl substituted alkoxy, acyloxy, halogen, or amino silanes. For example, the aromatic alkoxysilane may be, but is not limited to, aminophenyltrimethoxy silane (sometimes referred to herein as "APhTMS"), aminophenyldimethoxy silane, aminophenyltriethoxy silane, aminophenyldiethoxy silane, 3-(m-aminophenoxy) propyltrimethoxy silane, 3-(m-aminophenoxy) propyldimethoxy silane, 3-(m-aminophenoxy) propyltriethoxy silane, 3-(m-aminophenoxy) propyldiethoxy silane, N-phenylaminopropyltrimethoxysilane, N-phenylaminopropyldimethoxysilane, N-phenylaminopropyltriethoxysilane, N-phenylaminopropyldiethoxysilane, hydrolysates thereof, or oligomerized chemical composition thereof.

In additional embodiments, the utilized silane may be an aliphatic chemical composition. As used herein, an aliphatic chemical composition is non-aromatic, such as a chemical composition having an open chain structure, such as, but not limited to, alkanes, alkenes, and alkynes. For example, in some embodiments, the silane may comprise a chemical composition that is an alkoxysilane and may be an aliphatic alkoxysilane such as, but not limited to, a dialkoxysilane chemical composition, a hydrolysate thereof, or an oligomer thereof, or a trialkoxysilane chemical composition, a hydrolysate thereof, or an oligomer thereof. In some embodiments, the aliphatic silane may comprise an amine moiety, and may be an alkoxysilane comprising an amine moiety, such as an aminoalkyltrialkoxysilane. In one embodiment, an aliphatic silane chemical composition may be selected from the group consisting of 3-aminopropyl, N-(2-aminoethyl)-3-aminopropyl, vinyl, methyl, N-phenylaminopropyl, (N-phenylamino)methyl, N-(2-Vinylbenzylaminoethyl)-3-aminopropyl substituted alkoxy, acyloxy, halogen, or amino silanes, hydrolysates thereof, or oligomers thereof. Aminoalkyltrialkoxysilanes, include, but are not limited to, 3-aminopropyltrimethoxy silane (sometimes referred to herein as "GAPS"), 3-aminopropyldimethoxy silane, 3-aminopropyltriethoxy silane, 3-aminopropyldiethoxy silane, N-(2-aminoethyl)-3-aminopropyltrimethoxysilane, N-(2-aminoethyl)-3-aminopropyldimethoxysilane, N-(2-aminoethyl)-3-aminopropyltriethoxysilane, N-(2-aminoethyl)-3-aminopropyldiethoxysilane, hydrolysates thereof, and oligomerized chemical composition thereof. In other embodiments, the aliphatic alkoxysilane chemical composition may not contain an amine moiety, such as an alkyltrialkoxysilane or alkyldialkoxysilane. Such alkyltrialkoxysilanes or alkyldialkoxysilanes include, but are not limited to, vinyltrimethoxy silane, vinyldimethoxy silane, vinyltriethoxy silane, vinyldiethoxy silane, methyltrimethoxysilane, methyldimethoxysilane, methyltriethoxysilane, methyldiethoxysilane, hydrolysates thereof, or oligomerized chemical composition thereof.

In one or more embodiments, the coating 120 comprises one or more thermally stable polymers in additions to polysilazane. Contemplated polymers include, without limitation, polyimides, polybenzimidazoles, polysulfones, polyetheretheketones, polyetherimides, polyamides, polyphenyls, polybenzothiazoles, polybenzoxazoles, polybisthiazoles, fluoropolymers, silicone resins, and polyaromatic heterocyclic polymers with and without organic or inorganic fillers. For example, polymers disclosed in U.S. Pat. No. 9,763,852, the teachings of which are incorporated herein by reference, may be used in combination with the presently disclosed polysilazanes in the coating 120.

According to presently disclosed embodiments, the coating 120 may comprise nitrogen in an amount of at least 1 atomic percent (atm. %), at least 2 atm. %, at least 3 atm. %, at least 4 atm. %, at least 5 atm. %, at least 6 atm. %, at least 7 atm. %, at least 8 atm. %, at least 9 atm. %, at least 10 atm. %, at least 12 atm. %, at least 14 atm. %, at least 16 atm. %, at least 18 atm. %, or at least 20 atm. %. Such a determination can be made by analyzing XPS data of the nitrogen content throughout the entire thickness of the coating 120. For example, the atomic concentration data points for nitrogen can be averaged to determine the overall atomic percentage of nitrogen in the coating 120.

In additional embodiments, at least a portion of the coating 120 may comprise nitrogen in an amount of at least 1 atm. %, at least 2 atm. %, at least 3 atm. %, at least 4 atm. %, at least 5 atm. %, at least 6 atm. %, at least 7 atm. %, at least 8 atm. %, at least 9 atm. %, at least 10 atm. %, at least 12 atm. %, at least 14 atm. %, at least 16 atm. %, at least 18 atm. %, or at least 20 atm. %. This determination can be made by XPS data and finding the maximum atomic concentration of nitrogen at any single thickness in the coating 120.

In one embodiment, the coating 120 may be applied as an uncured coating precursor mixture, and then subsequently cured. The "coating precursor mixture" refers to the liquid solution which contains the silazane or other precursors of the cured polysilazane material which is applied to the glass body 102. In some embodiments, the coating precursor mixture will include one or more organic solvents along with the polymer precursor (e.g., monomers or prepolymers of polysilazanes). The coating precursor mixture may include one or more chemical constituents that contain material which will become a constituent in the coating 120 following application and curing of the coated glass container 100 (e.g., by spray or dip coating, followed by heating). That is, at least some of the atoms of the precursor will become the atoms of the formed coating. In additional embodiments, prepolymers or even fully polymerized polysilazane may be included in the coating precursor mixture.

Referring again to FIGS. 1 and 2, the coating 120 may be applied in a single deposition step where the coating 120 comprises a single layer. Deposition may be by a submersion process, or alternatively, the coating 120 may be applied by a spray or other suitable means, and optionally dried. A description of suitable deposition methods for the coatings 120 described herein may be found in U.S. patent application Ser. No. 13/780,740 entitled "Glass Articles with Low-Friction Coatings," which is incorporated by reference in its entirety herein. In additional embodiments, multiple depositions may be utilized. For example, multiple coating precursor mixture depositions may be performed and then cured, or curing may follow each deposition step, such that a second coating of precursor is applied onto a cured layer. It should be understood that the deposition technique may depend on the geometry of the glass article.

Following deposition of the coating precursor mixture, at least a portion of the organic solvent of the coating precursor mixture is liberated, either by passive drying or by active drying step(s) such as controlled air flow or increased temperatures. The coated glass containers 100 may then be cured by exposure to heat. As described herein, "curing" refers to any process (usually by heating) which changes the material on the coating from the precursor material to an intermediate or final material. For example, some embodiments utilize a curing by heating which liberates constituents from the metal oxide precursor and forms the metal oxide. Such curing may comprise heating the coated vial at temperature sufficient to polymerize the polysilazane, such as from 200° C. to 300° C. Curing conditions may depend on the type of precursor materials utilized. Without being bound by theory, it is believed that the curing step liberates any remaining solvents of the coating precursor mixture. In some embodiments, curing may be at greater temperatures, such as at least 300° C., at least 400° C., at least 500° C., or even at least 600° C.

It should be understood that in some embodiments, no heated curing may be necessary. In additional embodiments, dry heating may be used to cure the polysilazane. Dry heating may refer to heating which is performed at approximately atmospheric humidity, or at least where moisture is not actively added. In additional embodiments, the curing environment may be sufficiently void of humidity, such as when a nitrogen gas curing process is utilized. This is in contrast to some known polysilazane curing processes which utilize steam. It is believed that dry heating may promote organic functionality in the cured coating, whereas steam processing may promote the reaction of polysilazane with water, which may cause the evolution of $H_2$ and/or $NH_3$ and formation of a siloxane network.

The coating 120 applied to the glass body 102 may have a thickness of less than or equal to about 100 μm, less than or equal to about 10 μm, less than or equal to about 8 μm, less than or equal to about 6 μm, less than or equal to about 4 μm, less than or equal to about 3 μm, less than or equal to about 2 μm, or even less than or equal to about 1 μm. In some embodiments, the thickness of the coating 120 may be less than or equal to about 800 nm, less than or equal to about 600 nm, less than or equal to about 400 nm 300 nm, less than or equal to about 200 nm, or even less than or equal to about 100 nm thick. In other embodiments, the coating 120 may be less than about 90 nm thick, less than about 80 nm thick, less than about 70 nm thick, less than about 60 nm thick, less than about 50 nm, or even less than about 25 nm thick. In embodiments, the coating 120 may have a thickness of at least about 10 nm, at least about 15 nm, at least about 20 nm, at least about 25 nm, at least about 30 nm, at least about 35 nm, at least about 40 nm, or even at least about 45 nm. Exemplary embodiments may have a thickness of from about 20 nm to about 50 nm, from about 25 nm to about 45 nm, or from about 30 nm to about 40 nm. Without being bound by theory, it is believed that relatively thin coatings (i.e., less than 20 nm) may not adequately protect the glass, resulting in checking on the glass surface during vial-to-vial contact. In addition such relatively thin coatings may not survive a depyrogenation process. On the other hand, relatively thick coatings (i.e., greater than 50 nm) may be more easily damaged and wear tracks in the coating may appear from vial-on-vial contacting. It should be noted that in the case of the relatively thick coatings, the wear tracks are believed to be deformations in the coating, and not in the glass. As described herein, wear tracks are visible tracks caused by abrasion on a coating, leaving a track or scuff. In some embodiments, wear tracks may signify glass checking and/or relatively high coefficient of friction (e.g., 0.7 or greater). In one or more embodiments, the desired coating thickness may be achieved by tuning the amount of monomer or prepolymer in the solvent/polymer mixture that is applied to the glass container.

In some embodiments, the coating 120 may not be of uniform thickness over the entirety of the glass body 102. For example, the coated glass container 100 may have a thicker coating 120 in some areas, due to the process of contacting the glass body 102 with one or more coating solutions that form the coating 120. In some embodiments, the coating 120 may have a non-uniform thickness. For example, the coating thickness may be varied over different regions of a coated glass container 100, which may promote protection in a selected region.

Several non-limiting advantages of the presently disclosed polysilazane coatings with respect to other polymer-based coatings for pharmaceutical packages may be observed. One such advantage may be improved adhesion on glass surface due to stronger physical interactions and chemical bonding between the polysilazane and surface silanol of glass. In contrast, polyimide coatings may need amino-functionalized alkoxy silane as coupling agent to enhance coating adhesion, which add cost and processing difficulties. Additionally or alternatively, precursors which form the polysilazane may be soluble in various environmentally benign organic solvents of low boiling point, while the precursors of other coating systems, such as polyimide coatings, may need to be dissolved in very high boiling point solvents, such as polyamic acid Novastrat 800 in toluene/DMF, and the polyamic acid precursor of PMDA-ODA (poly(4,4'-oxydiphenylene-pyromellitimide) in NMP. For example, the tert-butyl acetate, toluene, or n-propyl acetate may be suitable solvents for the presently disclosed embodiments.

The glass containers of the pharmaceutical packages, to which the coating 120 may be applied, may be formed from a variety of different glass compositions. The specific composition of the glass article may be selected according to the specific application such that the glass has a desired set of physical properties. According to one or more embodiments, the glass may be a composition which is known to exhibit chemical durability and low thermal expansion, such as alkali borosilicate glasses. According to another embodiment, may be formed from a Type I, Class B glass according to ASTM Standard E438-92.

The glass containers may be formed from a glass composition which has a coefficient of thermal expansion in the range from about $25 \times 10^{-7}/°C$ to $80 \times 10^{-7}/°C$. For example, in some embodiments described herein, the glass body 102 is formed from alkali aluminosilicate glass compositions which are amenable to strengthening by ion exchange. Such compositions generally include a combination of $SiO_2$, $Al_2O_3$, at least one alkaline earth oxide, and one or more alkali oxides, such as $Na_2O$ and/or $K_2O$. In some of these embodiments, the glass composition may be free from boron and compounds containing boron. In some other embodiments the glass compositions may further comprise minor amounts of one or more additional oxides such as, for example, $SnO_2$, $ZrO_2$, $ZnO$, $TiO_2$, $As_2O_3$, or the like. These components may be added as fining agents and/or to further enhance the chemical durability of the glass composition. In another embodiment, the glass surface may comprise a metal oxide coating comprising $SnO_2$, $ZrO_2$, $ZnO$, $TiO_2$, $As_2O_3$, or the like.

In some embodiments described herein, the glass body 102 is strengthened such as by ion-exchange strengthening, herein referred to as "ion-exchanged glass". For example, the glass body 102 may have a compressive stress of greater than or equal to about 300 MPa or even greater than or equal to about 350 MPa. In some embodiments, the compressive stress may be in a range from about 300 MPa to about 900 MPa. However, it should be understood that, in some embodiments, the compressive stress in the glass may be less than 300 MPa or greater than 900 MPa. In some embodiments, the glass body 102 may have a depth of layer greater than or equal to 20 µm. In some of these embodiments, the depth of layer may be greater than 50 µm or even greater than or equal to 75 µm. In still other embodiments, the depth of the layer may be up to or greater than 100 µm. The ion-exchange strengthening may be performed in a molten salt bath maintained at temperatures from about 350° C. to about 500° C. To achieve the desired compressive stress, the glass container (uncoated) may be immersed in the salt bath for less than about 30 hours or even less than about 20 hours. For example, in one embodiment the glass container is immersed in a 100% KNOB salt bath at 450° C. for about 8 hours.

In one particularly exemplary embodiment, the glass body 102 may be formed from an ion exchangeable glass composition described in pending U.S. patent application Ser. No. 13/660,894 filed Oct. 25, 2012, and entitled "Glass Compositions with Improved Chemical and Mechanical Durability" assigned to Corning, Incorporated.

However it should be understood that the coated glass containers 100 described herein may be formed from other glass compositions including, without limitation, ion-exchangeable glass compositions and non-ion exchangeable glass compositions. For example, in some embodiments the glass container may be formed from Type 1B glass compositions such as, for example, Schott Type 1B borosilicate glass.

In some embodiments described herein, the glass article may be formed from a glass composition which meets the criteria for pharmaceutical glasses described by regulatory agencies such as the USP (United States Pharmacopoeia), the EP (European Pharmacopeia), and the JP (Japanese Pharmacopeia) based on their hydrolytic resistance. Per USP 660 and EP 7, borosilicate glasses meet the Type I criteria and are routinely used for parenteral packaging. Examples of borosilicate glass include, but are not limited to, Corning® Pyrex® 7740, 7800 and Wheaton 180, 200, and 400, Schott Duran, Schott Fiolax, KIMAX® N-51A, Gerrescheimer GX-51 Flint and others. Soda-lime glass meets the Type III criteria and is acceptable in packaging of dry powders which are subsequently dissolved to make solutions or buffers. Type III glasses are also suitable for packaging liquid formulations that prove to be insensitive to alkali. Examples of Type III soda lime glass include Wheaton 800 and 900. De-alkalized soda-lime glasses have higher levels of sodium hydroxide and calcium oxide and meet the Type II criteria. These glasses are less resistant to leaching than Type I glasses but more resistant than Type III glasses. Type II glasses can be used for products that remain below a pH of 7 for their shelf life. Examples include ammonium sulfate treated soda lime glasses. These pharmaceutical glasses have varied chemical compositions and have a coefficient of linear thermal expansion (CTE) in the range of $20\text{-}85 \times 10^{-7}/°$ C.

When the coated glass articles described herein are glass containers, the glass body 102 of the coated glass containers 100 may take on a variety of different forms. For example, the glass bodies described herein may be used to form coated glass containers 100 such as vials, ampoules, cartridges, syringe bodies and/or any other glass container for storing pharmaceutical compositions. Moreover, the ability to chemically strengthen the glass containers prior to coating can be utilized to further improve the mechanical durability of the glass containers. Accordingly, it should be understood that, in at least one embodiment, the glass containers may be ion exchange strengthened prior to application of the coating. Alternatively, other strengthening methods such as heat tempering, flame polishing, and laminating, as described in U.S. Pat. No. 7,201,965, could be used to strengthen the glass before coating.

Various properties of the coated glass containers (i.e., coefficient of friction, horizontal compression strength, 4-point bend strength) may be measured when the coated glass containers are in an as-coated condition (i.e., following application of the coating without any additional treatments other than curing if applicable) or following one or more processing treatments, such as those similar or identical to treatments performed on a pharmaceutical filling line, including, without limitation, washing, lyophilization, depyrogenation, autoclaving, or the like.

Depyrogenation is a process wherein pyrogens are removed from a substance. Depyrogenation of glass articles, such as pharmaceutical packages, can be performed by a thermal treatment applied to a sample in which the sample is heated to an elevated temperature for a period of time. For example, depyrogenation may include heating a glass container to a temperature of between about 250° C. and about 380° C. for a time period from about 30 seconds to about 72 hours, including, without limitation, 20 minutes, 30 minutes 40 minutes, 1 hour, 2 hours, 4 hours, 8 hours, 12 hours, 24 hours, 48 hours, and 72 hours. Following the thermal treatment, the glass container is cooled to room temperature. One conventional depyrogenation condition commonly employed in the pharmaceutical industry is thermal treatment at a temperature of about 250° C. for about 30 minutes. However, it is contemplated that the time of thermal treatment may be reduced if higher temperatures are utilized. The coated glass containers, as described herein, may be exposed to elevated temperatures for a period of time. The elevated temperatures and time periods of heating described herein may or may not be sufficient to depyrogenate a glass container. However, it should be understood that some of the temperatures and times of heating described herein are sufficient to depyrogenate a coated glass container, such as the coated glass containers described herein. For example, as described herein, the coated glass containers may be exposed to temperatures of about 250° C., about 260° C. about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. It is recognized that depyrogenation processes may have times other than 30 minutes, and 30 minutes is used throughout this disclosure with a depyrogenation temperature for comparative purposes such as, for example, coefficient of friction testing following exposure to a defined depyrogenation condition.

As used herein, lyophilization conditions (i.e., freeze drying) refer to a process in which a sample is filled with a liquid that contains protein and then frozen at low temperatures, such as −100° C., followed by water sublimation for a time such as 20 hours at a temperatures such as −15° C. under vacuum.

As used herein, autoclave conditions refer to steam purging a sample for a time period such as 10 minutes at 100° C., followed by a 20 minute dwelling period wherein the sample is exposed to a 121° C. environment, followed by 30 minutes of heat treatment at 121° C. It should be understood that autoclaving is distinct from a curing process, such as curing process utilizing steam.

The coefficient of friction ($\mu$) of the portion of the coated glass container with the coating may have a lower coefficient of friction than a surface of an uncoated glass container formed from a same glass composition. A coefficient of friction ($\mu$) is a quantitative measurement of the friction between two surfaces and is a function of the mechanical and chemical properties of the first and second surfaces, including surface roughness, as well as environmental conditions such as, but not limited to, temperature and humidity. As used herein, a coefficient of friction measurement for coated glass container 100 is reported as the coefficient of friction between the outer surface of a first glass container (having an outer diameter of between about 16.00 mm and about 17.00 mm) and the outer surface of second glass container which is substantially identical to the first glass container, wherein the first and second glass containers have the same body and the same coating composition (when applied) and have been exposed to the same environments prior to fabrication, during fabrication, and after fabrication. Unless otherwise denoted herein, the coefficient of friction refers to the maximum coefficient of friction measured with a normal load of 30 N measured on a vial-on-vial testing jig, as described herein. However, it should be understood that a coated glass container which exhibits a maximum coefficient of friction at a specific applied load will also exhibit the same or better (i.e., lower) maximum coefficient of friction at a lesser load. For example, if a coated glass container exhibits a maximum coefficient of friction of 0.5 or lower under an applied load of 50 N, the coated glass container will also exhibit a maximum coefficient of friction of 0.5 or lower under an applied load of 25 N. To measure a maximum coefficient of friction, local maxima at or near the beginning of the test are excluded, as such maxima at or near the beginning of the test represent static coefficient of friction. As described in the embodiments herein, the coefficient of friction was measured where the speed of the containers relative to one another was about 0.67 mm/s.

Figure 3:
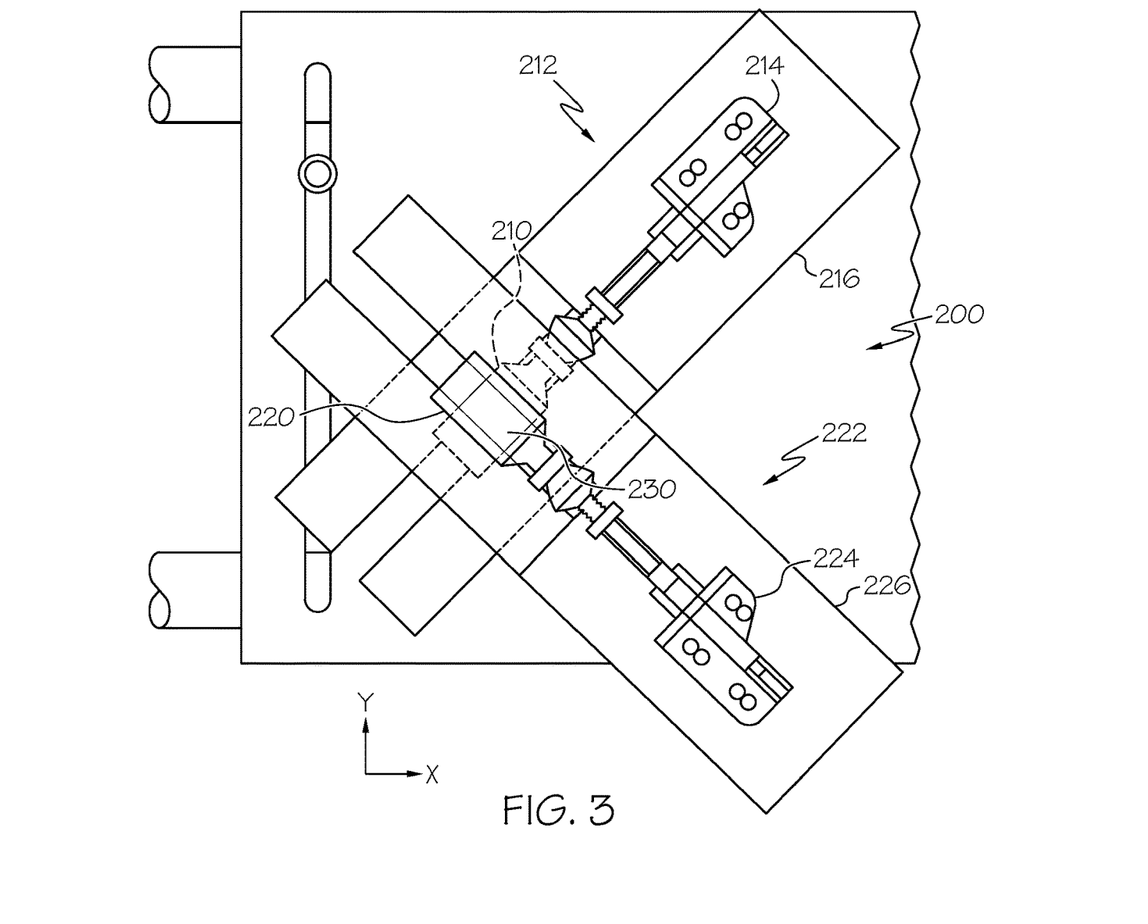
FIG. 3 schematically depicts a testing jig for determining the coefficient of friction between two surfaces, according to one or more embodiments shown and described herein.

In the embodiments described herein, the coefficient of friction of the glass containers (both coated and uncoated) is measured with a vial-on-vial testing jig. The testing jig 200 is schematically depicted in FIG. 3. The same apparatus may also be used to measure the frictive force between two glass containers positioned in the jig. The vial-on-vial testing jig 200 comprises a first clamp 212 and a second clamp 222 arranged in a cross configuration (i.e., perpendicular to one another). The first clamp 212 comprises a first securing arm 214 attached to a first base 216. The first securing arm 214 attaches to the first glass container 210 and holds the first glass container 210 stationary relative to the first clamp 212. Similarly, the second clamp 222 comprises a second securing arm 224 attached to a second base 226. The second securing arm 224 attaches to the second glass container 220 and holds it stationary relative to the second clamp 222. The first glass container 210 is positioned on the first clamp 212 and the second glass container 220 is positioned of the second clamp 222 such that the long axis of the first glass container 210 and the long axis of the second glass container 220 are positioned at about a 90° angle relative to one another and on a horizontal plane defined by the x-y axis.

A first glass container 210 is positioned in contact with the second glass container 220 at a contact point 230. A normal force is applied in a direction orthogonal to the horizontal plane defined by the x-y axis. The normal force may be applied by a static weight or other force applied to the second clamp 222 upon a stationary first clamp 212. For example, a weight may be positioned on the second base 226 and the first base 216 may be placed on a stable surface, thus inducing a measurable force between the first glass container 210 and the second glass container 220 at the contact point 230. Alternatively, the force may be applied with a mechanical apparatus, such as a UMT (universal mechanical tester) machine.

The first clamp 212 or second clamp 222 may be moved relative to the other in a direction which is at a 45° angle with the long axis of the first glass container 210 and the second glass container 220. For example, the first clamp 212 may be held stationary and the second clamp 222 may be moved such that the second glass container 220 moves across the first glass container 210 in the direction of the x-axis. A similar setup is described by R. L. De Rosa et al., in "Scratch Resistant Polyimide Coatings for Alumino Silicate Glass surfaces" in The Journal of Adhesion, 78: 113-127, 2002. To measure the coefficient of friction, the force required to move the second clamp 222 and the normal force applied to first and second glass containers 210, 220 are measured with load cells and the coefficient of friction is calculated as the quotient of the frictive force and the normal force. The jig is operated in an environment of 25° C. and 50% relative humidity.

In the embodiments described herein, the portion of the coated glass container with the coating has a coefficient of friction of less than or equal to about 0.7 relative to a like-coated glass container, as determined with the vial-on-vial jig described above. In other embodiments, the coefficient of friction may be less than or equal to about 0.6, or even less than or equal to about 0.5. In some embodiments, the portion of the coated glass container with the coating has a coefficient of friction of less than or equal to about 0.4 or even less than or equal to about 0.3. Coated glass containers with coefficients of friction less than or equal to about 0.7 generally exhibit improved resistance to frictive damage and, as a result, have improved mechanical properties. For example, conventional glass containers (without a coating) may have a coefficient of friction of greater than 0.7.

In some embodiments described herein, the coefficient of friction of the portion of the coated glass container with the coating is at least 20% less than a coefficient of friction of a surface of an uncoated glass container formed from a same glass composition. For example, the coefficient of friction of the portion of the coated glass container with the coating may be at least 20% less, at least 25% less, at least 30% less, at least 40% less, or even at least 50% less than a coefficient of friction of a surface of an uncoated glass container formed from a same glass composition.

In some embodiments, the portion of the coated glass container with the coating may have a coefficient of friction of less than or equal to about 0.7 after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In other embodiments, the portion of the coated glass container with the coating may have a coefficient of friction of less than or equal to about 0.7, (i.e., less than or equal to about 0.6, less than or equal to about 0.5, less than or equal to about 0.4, or even less than or equal to about 0.3) after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the coefficient of friction of the portion of the coated glass container with the coating may not increase by more than about 30% after exposure to a temperature of about 250° C. (or about 260° C.) for 30 minutes. In other embodiments, coefficient of friction of the portion of the coated glass container with the coating may not increase by more than about 30% (i.e., about 25%, about 20%, about 15%, or even about 10%) after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In other embodiments, coefficient of friction of the portion of the coated glass container with the coating may not increase by more than about 0.5 (i.e., about 0.45, about 0.4, about 0.35, about 0.3, about 0.25, about 0.2, about 0.15, about 0.1, or even about 0.05) after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the coefficient of friction of the portion of the coated glass container with the coating may not increase at all after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes.

In some embodiments, the portion of the coated glass container with the coating may have a coefficient of friction of less than or equal to about 0.7 after being submerged in a water bath at a temperature of about 70° C. for 10 minutes. In other embodiments, the portion of the coated glass container with the coating may have a coefficient of friction of less than or equal to about 0.7, (i.e., less than or equal to about 0.6, less than or equal to about 0.5, less than or equal to about 0.4, or even less than or equal to about 0.3) after being submerged in a water bath at a temperature of about 70° C. for 5 minutes, 10 minutes, 20 minutes, 30 minutes, 40 minutes, 50 minutes, or even 1 hour. In some embodiments, the coefficient of friction of the portion of the coated glass container with the coating may not increase by more than about 30% after being submerged in a water bath at a temperature of about 70° C. for 10 minutes. In other embodiments, coefficient of friction of the portion of the coated glass container with the coating may not increase by more than about 30% (i.e., about 25%, about 20%, about 15%, or event about 10%) after being submerged in a water bath at a temperature of about 70° C. for 5 minutes, 10 minutes, 20 minutes, 30 minutes, 40 minutes, 50 minutes, or even 1 hour. In some embodiments, the coefficient of friction of the portion of the coated glass container with the coating may not increase at all after being submerged in a water bath at a temperature of about 70° C. for 5 minutes, 10 minutes, 20 minutes, 30 minutes, 40 minutes, 50 minutes, or even 1 hour.

In some embodiments, the portion of the coated glass container with the coating may have a coefficient of friction of less than or equal to about 0.7 after exposure to lyophilization conditions. In other embodiments, the portion of the coated glass container with the coating may have a coefficient of friction of less than or equal to about 0.7, (i.e., less than or equal to about 0.6, less than or equal to about 0.5, less than or equal to about 0.4, or even less than or equal to about 0.3) after exposure to lyophilization conditions. In some embodiments, the coefficient of friction of the portion of the coated glass container with the coating may not increase by more than about 30% after exposure to lyophilization conditions. In other embodiments, coefficient of friction of the portion of the coated glass container with the coating may not increase by more than about 30% (i.e., about 25%, about 20%, about 15%, or event about 10%) after exposure to lyophilization conditions. In some embodiments, the coefficient of friction of the portion of the coated glass container with the coating may not increase at all after exposure to lyophilization conditions.

In some embodiments, the portion of the coated glass container with the coating may have a coefficient of friction of less than or equal to about 0.7 after exposure to autoclave conditions. In other embodiments, the portion of the coated glass container with the coating may have a coefficient of friction of less than or equal to about 0.7, (i.e., less than or equal to about 0.6, less than or equal to about 0.5, less than or equal to about 0.4, or even less than or equal to about 0.3) after exposure to autoclave conditions. In some embodiments, the coefficient of friction of the portion of the coated glass container with the coating may not increase by more than about 30% after exposure to autoclave conditions. In other embodiments, coefficient of friction of the portion of the coated glass container with the coating may not increase by more than about 30% (i.e., about 25%, about 20%, about 15%, or event about 10%) after exposure to autoclave conditions. In some embodiments, the coefficient of friction of the portion of the coated glass container with the coating may not increase at all after exposure to autoclave conditions.

The coated glass containers described herein have a horizontal compression strength. The horizontal compression strength, as described herein, is measured by positioning the coated glass container 100 horizontally between two parallel platens which are oriented in parallel to the long axis of the glass container. A mechanical load is then applied to the coated glass container 100 with the platens in the direction perpendicular to the long axis of the glass container. Prior to being placed in the platens, the glass containers are wrapped in 2 inch tape, and the overhang is cut off or folded around the bottom of the container. The container is then positioned within an index card that is stapled around the specimen. The load rate for vial compression is 0.5 in/min, meaning that the platens move towards each other at a rate of 0.5 in/min. The horizontal compression strength is measured at 25° C.±2° C. and 50%±5% relative humidity. It is desirable, in some embodiments, to perform the horizontal compression test within 1 hour (and not more than 24 hours) following depyrogenation to simulate pharmaceutical filling line conditions. The horizontal compression strength is a measurement of load at failure, and measurement of the horizontal compression strength can be given as a failure probability at a selected normal compression load. As used herein, failure occurs when the glass container ruptures under a horizontal compression in least 50% of samples. Thus, the horizontal compression is provided for a group of samples. In some embodiments, a coated glass container may have a horizontal compression strength at least 10%, 20%, or 30% greater than an uncoated vial.

Referring now to FIGS. 1 and 3, the horizontal compression strength measurement may also be performed on an abraded glass container. Specifically, operation of the testing jig 200 may create damage on the coated glass container outer surface 122, such as a surface scratch or abrasion that weakens the strength of the coated glass container 100. The glass container is then subjected to the horizontal compression procedure described above, wherein the container is placed between two platens with the scratch pointing outward parallel to the platens. The scratch can be characterized by the selected normal pressure applied by a vial-on-vial jig and the scratch length. Unless identified otherwise, scratches for abraded glass containers for the horizontal compression procedure are characterized by a scratch length of 20 mm created by a normal load of 30 N. It may be desired to have the scratch at a 90° angle relative to the platens, ±5°.

The coated glass containers can be evaluated for horizontal compression strength following a heat treatment. The heat treatment may be exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the horizontal compression strength of the coated glass container is not reduced by more than about 20%, 30%, or even 40% after being exposed to a heat treatment, such as those described above, and then being abraded, as described above. In one embodiment, the horizontal compression strength of the coated glass container is not reduced by more than about 20% after being exposed to a heat treatment of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes, and then being abraded.

The coated glass articles described herein may be thermally stable after heating to a temperature of at least 250° C. (or 260° C., or 280° C., or 300° C.) for a time period of 30 minutes. The phrase "thermally stable," as used herein, means that the coating applied to the glass article remains substantially intact on the surface of the glass article after exposure to the elevated temperatures such that, after exposure, the mechanical properties of the coated glass article, specifically the coefficient of friction and the horizontal compression strength, are only minimally affected, if at all. This indicates that the coating remains adhered to the surface of the glass following elevated temperature exposure and continues to protect the glass article from mechanical insults such as abrasions, impacts and the like.

In the embodiments described herein, a coated glass article is considered to be thermally stable if the coated glass article meets both a coefficient of friction standard and a horizontal compression strength standard after heating to the specified temperature and remaining at that temperature for the specified time. To determine if the coefficient of friction standard is met, the coefficient of friction of a first coated glass article is determined in as-received condition (i.e., prior to any thermal exposure) using the testing jig depicted in FIG. 3 and a 30 N applied load. A second coated glass article (i.e., a glass article having the same glass composition and the same coating composition as the first coated glass article) is thermally exposed under the prescribed conditions and cooled to room temperature. Thereafter, the coefficient of friction of the second glass article is determined using the testing jig depicted in FIG. 3 to abrade the coated glass article with a 30 N applied load resulting in an abrasion (i.e., a "scratch") having a length of approximately 20 mm. If the coefficient of friction of the second coated glass article is less than 0.7 and the surface of the glass of the second glass article in the abraded area does not have any observable damage, then the coefficient of friction standard is met for purposes of determining the thermal stability of the coating. The term "observable damage," as used herein means that the surface of the glass in the abraded area of the glass article contains less than six glass checks per 0.5 cm of length of the abraded area when observed with a Nomarski or differential interference contrast (DIC) spectroscopy microscope at a magnification of 100× with LED or halogen light sources. A standard definition of a glass check or glass checking is described in G. D. Quinn, "NIST Recommended Practice Guide: Fractography of Ceramics and Glasses," NIST special publication 960-17 (2006).

To determine if the horizontal compression strength standard is met, a first coated glass article is abraded in the testing jig depicted in FIG. 3 under a 30 N load to form a 20 mm scratch. The first coated glass article is then subjected to a horizontal compression test, as described herein, and the retained strength of the first coated glass article is determined. A second coated glass article (i.e., a glass article having the same glass composition and the same coating composition as the first coated glass article) is thermally exposed under the prescribed conditions and cooled to room temperature. Thereafter, the second coated glass article is abraded in the testing jig depicted in FIG. 3 under a 30 N load. The second coated glass article is then subjected to a horizontal compression test, as described herein, and the retained strength of the second coated glass article is determined. If the retained strength of the second coated glass article does not decrease by more than about 20% relative to the first coated glass article (i.e., the load to failure does not decrease by more than 20%) then the horizontal compression strength standard is met for purposes of determining the thermal stability of the coating.

The coated glass containers are considered to be thermally stable if the coefficient of friction standard and the horizontal compression strength standard are met after exposing the coated glass containers to a temperature of at least about 250° C. (or 260° C. or 280° C.) for a time period of at least about 30 minutes (i.e., the coated glass containers are thermally stable at a temperature of at least about 250° C. (or 260° C. or 280° C.) for a time period of about 30 minutes). The thermal stability may also be assessed at temperatures from about 250° C. (or 260° C. or 280° C.) up to about 400° C. For example, in some embodiments, the coated glass containers will be considered to be thermally stable if the standards are met at a temperature of at least about 270° C. or even about 280° C. for a time period of about 30 minutes. In still other embodiments, the coated glass containers will be considered to be thermally stable if the standards are met at a temperature of at least about 290° C. or even about 300° C. for a time period of about 30 minutes. In further embodiments, the coated glass containers will be considered to be thermally stable if the standards are met at a temperature of at least about 310° C. or even about 320° C. for a time period of about 30 minutes. In still other embodiments, the coated glass containers will be considered to be thermally stable if the standards are met at a temperature of at least about 330° C. or even about 340° C. for a time period of about 30 minutes. In yet other embodiments, the coated glass containers will be considered to be thermally stable if the standards are met at a temperature of at least about 350° C. or even about 360° C. for a time period of about 30 minutes. In some other embodiments, the coated glass containers will be considered to be thermally stable if the standards are met at a temperature of at least about 370° C. or even about 380° C. for a time period of about 30 minutes. In still other embodiments, the coated glass containers will be considered to be thermally stable if the standards are met at a temperature of at least about 390° C. or even about 400° C. for a time period of about 30 minutes.

The coated glass containers disclosed herein may also be thermally stable over a range of temperatures, meaning that the coated glass containers are thermally stable by meeting the coefficient of friction standard and horizontal compression strength standard at each temperature in the range. For example, in the embodiments described herein, the coated glass containers may be thermally stable from at least about 250° C. (or 260° C. or 280° C.) to a temperature of less than or equal to about 400° C. In some embodiments, the coated glass containers may be thermally stable in a range from at least about 250° C. (or 260° C. or 280° C.) to about 350° C. In some other embodiments, the coated glass containers may be thermally stable from at least about 280° C. to a temperature of less than or equal to about 350° C. In still other embodiments, the coated glass containers may be thermally stable from at least about 290° C. to about 340° C. In another embodiment, the coated glass container may be thermally stable at a range of temperatures of about 300° C. to about 380° C. In another embodiment, the coated glass container may be thermally stable at a range of temperatures from about 320° C. to about 360° C.

The coated glass containers described herein have a four point bend strength. To measure the four point bend strength of a glass container, a glass tube that is the precursor to the coated glass container 100 is utilized for the measurement. The glass tube has a diameter that is the same as the glass container but does not include a glass container base or a glass container mouth (i.e., prior to forming the tube into a glass container). The glass tube is then subjected to a four point bend stress test to induce mechanical failure. The test is performed at 50% relative humidity with outer contact members spaced apart by 9" and inner contact members spaced apart by 3" at a loading rate of 10 mm/min.

The four point bend stress measurement may also be performed on a coated and abraded tube. Operation of the testing jig 200 may create an abrasion on the tube surface such as a surface scratch that weakens the strength of the tube, as described in the measurement of the horizontal compression strength of an abraded vial. The glass tube is then subjected to a four point bend stress test to induce mechanical failure. The test is performed at 25° C. and at 50% relative humidity using outer probes spaced apart by 9" and inner contact members spaced apart by 3" at a loading rate of 10 mm/min, while the tube is positioned such that the scratch is put under tension during the test.

In some embodiments, the four point bend strength of a glass tube with a coating after abrasion shows on average at least 10%, 20%, or even 50% higher mechanical strength than that for an uncoated glass tube abraded under the same conditions.

In some embodiments, after the coated glass container 100 is abraded by an identical glass container with a 30 N normal force, the coefficient of friction of the abraded area of the coated glass container 100 does not increase by more than about 20% following another abrasion by an identical glass container with a 30 N normal force at the same spot, or does not increase at all. In other embodiments, after the coated glass container 100 is abraded by an identical glass container with a 30 N normal force, the coefficient of friction of the abraded area of the coated glass container 100 does not increase by more than about 15% or even 10% following another abrasion by an identical glass container with a 30 N normal force at the same spot, or does not increase at all. However, it is not necessary that all embodiments of the coated glass container 100 display such properties.

The transparency and color of the coated container may be assessed by measuring the light transmission of the container within a range of wavelengths between 400-700 nm using a spectrophotometer. The measurements are performed such that a light beam is directed normal to the container wall such that the beam passes through the coating twice, first when entering the container and then when exiting it. In some embodiments, the light transmission through the coated glass container may be greater than or equal to about 55% of a light transmission through an uncoated glass container (passing through two walls of the container) for wavelengths from about 400 nm to about 700 nm. As described herein, a light transmission can be measured before a thermal treatment or after a thermal treatment, such as the heat treatments described herein. For example, for each wavelength of from about 400 nm to about 700 nm, the light transmission may be greater than or equal to about 55% of a light transmission through an uncoated glass container. In other embodiments, the light transmission through the coated glass container is greater than or equal to about 55%, about 60%, about 65%, about 70%, about 75%, about 80%, or even about 90% of a light transmission through an uncoated glass container for wavelengths from about 400 nm to about 700 nm.

As described herein, a light transmission can be measured before an environmental treatment, such as a thermal treatment described herein, or after an environmental treatment. For example, following a heat treatment of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes, or after exposure to lyophilization conditions, or after exposure to autoclave conditions, the light transmission through the coated glass container is greater than or equal to about 55%, about 60%, about 65%, about 70%, about 75%, about 80%, or even about 90% of a light transmission through an uncoated glass container for wavelengths from about 400 nm to about 700 nm.

In some embodiments, the coated glass container 100 may be perceived as colorless and transparent to the naked human eye when viewed at any angle. In some other embodiments, the coating 120 may have a perceptible tint, such as when the coating 120 comprises a polymer which is colored.

In some embodiments, the coated glass container 100 may have a coating 120 that is capable of receiving an adhesive label. That is, the coated glass container 100 may receive an adhesive label on the coated surface such that the adhesive label is securely attached. However, the ability of attachment of an adhesive label is not a requirement for all embodiments of the coated glass containers 100 described herein.

EXAMPLES

The various embodiments of glass containers with coatings will be further clarified by the following examples. The examples are illustrative in nature, and should not be understood to limit the subject matter of the present disclosure.

Example 1

Glass vials (ion-exchanged alkali-aluminosilicate in composition) were coated with mixed polysilazane coatings that included silazanes, siloxanes, and silanes. Specifically, vials were coated and tested utilizing three commercially available polysilazane solutions: HS-900, HS-907, and HS-908 (each available from Huntington Specialty Materials). To coat the vials, uncoated vials were heated at 320° C. for 20 minutes and then returned to room temperature. The HS-900, HS-907, and HS-908 solutions may be used as commercially provided without the addition of additional solvent. The coatings were applied to the exterior of the vials by dip coating, where the dip speed was 10 mm/s, the hold time was 5 s, and the return speed was 2 mm/s. Following dipping, the vials were held at room temperature for one hour and then cured in an oven (without added humidity) at 250° C. for 30 minutes.

Figure 4:
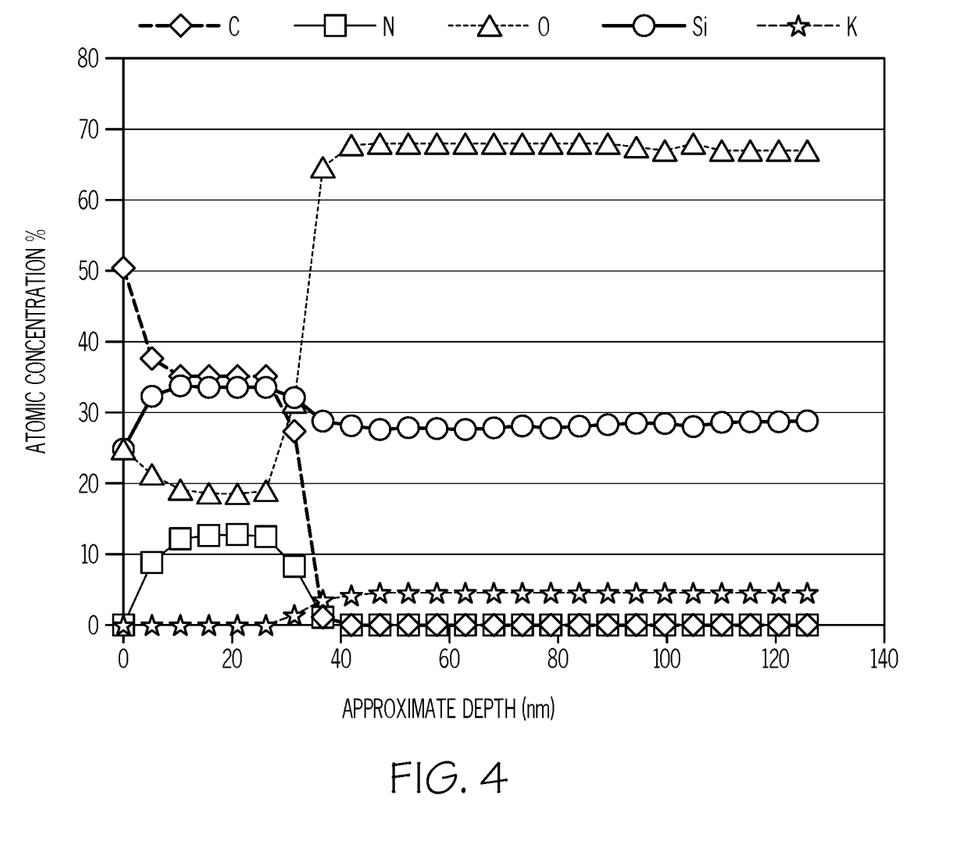
FIG. 4 graphically depicts an XPS depth profile for a coated glass container, according to one or more embodiments shown and described herein.
Figure 5:
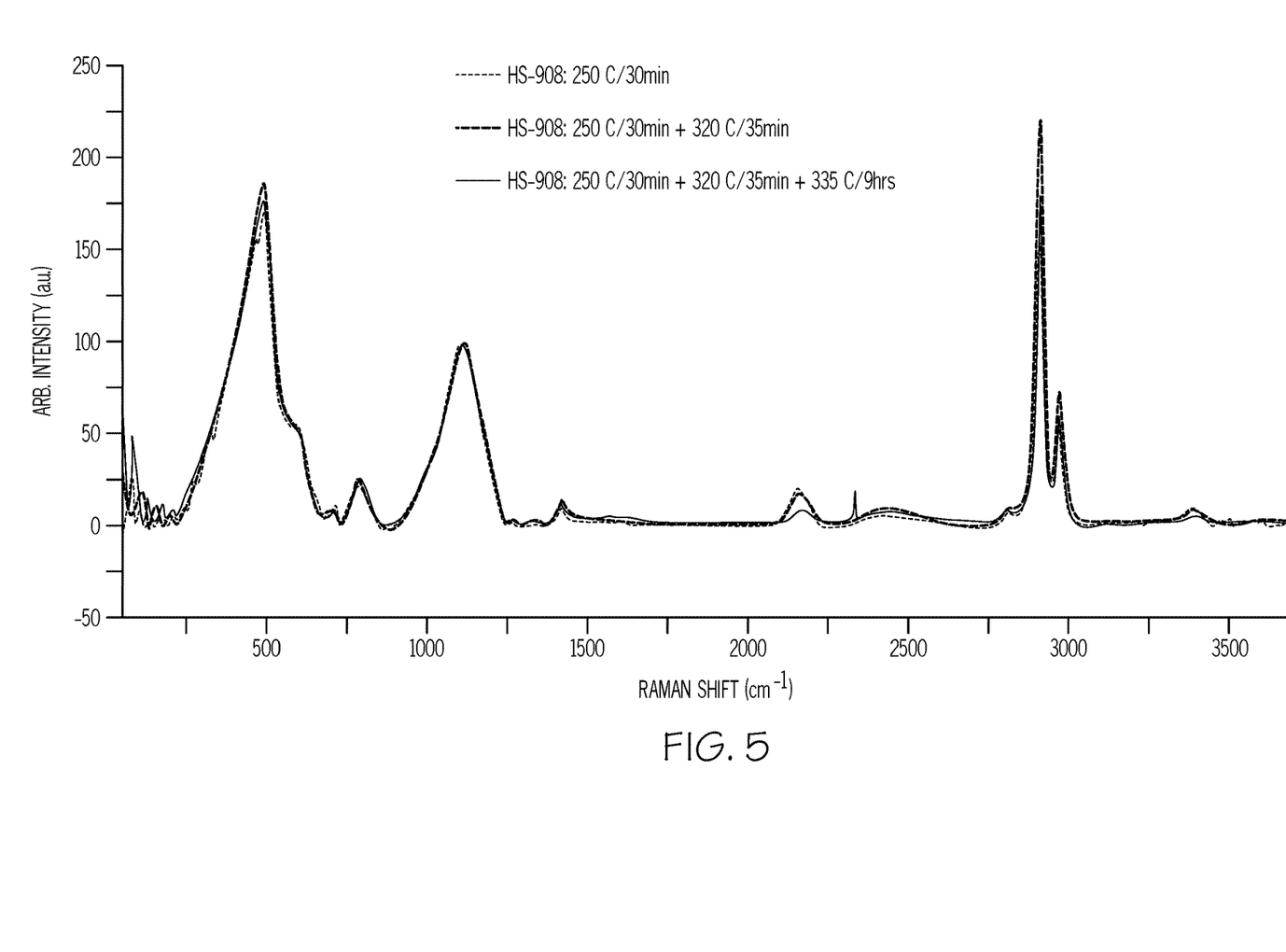
FIG. 5 graphically depicts a RAMAN spectroscopy of a coated glass container, according to one or more embodiments shown and described herein.

It should be noted that many conventional polysilazane curing processes utilize steam curing, but that dry curing was utilized in the instant examples. It is believed that utilizing dry heat may promote a coating with increased amounts of nitrogen. The organic nature of the coatings was assessed with X-ray photoelectron spectroscopy (XPS) and RAMAN analysis. FIG. 4 depicts the XPS depth profile of an HS-908 coated vial (following curing but without post-curing heat treatment). It should be understood that the depths are approximate since the depths are based on historical data correlated from the sputter rate of $SiO_2$. Additionally, FIG. 5 depicts RAMAN shift for HS-908 coated vials before any heat treatments and following heat treatments. The RAMAN shift demonstrates that some organic groups are present.

The coated and cured vials were subjected to additional heat treatments, such as at 320° C. for 35 minutes or 335° C. for 9 hours. Following such heat treatments, and prior to any heat treatment (not including the curing process), the average coefficient of friction was measured. Table 1, below, shows the average coefficient of friction (with 30 N or 5 N of force) measured following various heat treatments for the coatings made from HS-900, HS-907, and HS-908. Table 1 additionally shows the measured thickness of the coatings (prior to any heat treatment). Multiple tests were conducted on HS-908, which are shown in Table 1. The samples coated with HS-908 generally showed the lowest coefficient of friction. However, it was observed that HS-907 and HS-908 coated samples all had maximum coefficients of friction of well less than 0.7.

TABLE 1

Maximum Coefficient of Friction for Coatings of Example 1

|  | HS-900 | HS-907 | HS-908 (test 1) | HS-908 (test 2) |
|---|---|---|---|---|
| Thickness | 11-16 nm | 210-400 nm | 40-134 nm | 40-134 nm |
| CoF after curing at 250° C. for 30 min but no additional heat treatment (30N load) | 0.195 | 0.047 | 0.062 | 0.038 |
| CoF after curing at 250° C. for 30 min but no additional heat treatment (5N load) | X | X | X | 0.053 |
| CoF after curing at 250° C. for 30 min and additional heat treatment at 320° C. for 35 min (30N load) | 0.252 | 0.154 | 0.058 | 0.043 |
| CoF after curing at 250° C. for 30 min and additional heat treatment at 320° C. for 35 min (5N load) | 0.178 | 0.058 | 0.052 | 0.046 |
| CoF after curing at 250° C. for 30 min and additional heat treatment at 335° C. for 9 hours (30N load) | 0.693 | 0.188 | 0.172 | 0.102 |
| CoF after curing at 250° C. for 30 min and additional heat treatment at 335° C. for 9 hours (5N load) | 0.594 | 0.146 | 0.092 | 0.112 |

The HS-900, HS-907, and HS-908 formulations (non-cured) were also analyzed by F-NMR, which showed that the sample coatings did not include fluorine.

Following coating and resting at room temperature for 1 hour, curing at 250° C. for 30 min, and heated at 335° C. for 9 hours, the vials were visually inspected. The coating was transparent and colorless to the naked eye.

It should now be understood that the glass containers with low-frictive coatings described herein exhibit improved resistance to mechanical damage as a result of the application of the low frictive coating and, as such, the glass containers have enhanced mechanical durability. This property makes the glass containers well suited for use in various applications including, without limitation, pharmaceutical packaging materials.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A pharmaceutical package comprising:
a glass container comprising a first surface and a second surface opposite the first surface, wherein the first surface is an outer surface of the glass container; and
a cured coating positioned over at least a portion of the first surface of the glass container, wherein the cured coating comprises one or more polysilazanes, and wherein the cured coating comprises greater than 30 wt.% of the one or more polysilazanes;
wherein the portion of the first surface of the glass container with the cured coating retains a coefficient of friction of less than or equal to about 0.7 following a heat treatment at a temperature of at least about 250°C for 30 minutes, wherein the coefficient of friction is a maximum coefficient of friction measured relative to a second pharmaceutical package in a vial-on-vial testing jig under a normal load of 30 N, the second pharmaceutical package formed from the same glass composition and comprising the same cured coating and subjected to the same environmental conditions prior to measurement of the coefficient of friction.

2. The pharmaceutical package of claim 1, wherein one or more of the polysilazanes comprise an organic moiety.

3. The pharmaceutical package of claim 1, wherein at least a portion of the cured coating comprises at least 5 atm. % nitrogen.

4. The pharmaceutical package of claim 1, wherein the cured coating further comprises polysilane.

5. The pharmaceutical package of claim 1, wherein the cured coating further comprises polysiloxane.

6. The pharmaceutical package of claim 1, wherein the cured coating further comprises polysilane and polysiloxane.

7. The pharmaceutical package of claim 1, wherein the cured coating has a thickness of 1 micron or less.

8. The pharmaceutical package of claim 7, wherein the cured coating is in direct contact with at least a portion of the first surface of the glass container.

9. The pharmaceutical package of claim 1, wherein the cured coating comprises at least 40 wt. % of the one or more polysilazanes.

10. The pharmaceutical package of claim 1, wherein the cured coating comprising one or more polysilazanes is formed from silazane monomeric units or prepolymers comprising silazane monomeric units.

11. The pharmaceutical package of claim 1, wherein a light transmission through the pharmaceutical package is greater than or equal to about 55% of a light transmission through an uncoated pharmaceutical package for each wavelength from about 400 nm to about 700 nm.

12. The pharmaceutical package of claim 1, wherein the pharmaceutical package retains a light transmission through the pharmaceutical package of greater than or equal to about 55% of the light transmission through an uncoated pharmaceutical package for each wavelength from about 400 nm to about 700 nm following a heat treatment at a temperature of at least about 250° C. for 30 minutes.

13. The pharmaceutical package of claim 10, wherein the cured coating comprises at least 50 wt. % of the one or more polysilazanes.

14. The pharmaceutical package of claim 10, wherein one or more of the silazane monomeric units or prepolymers comprising silazane monomeric units comprise organic moieties.

15. A method of producing a coated pharmaceutical package, the method comprising:
- depositing a coating precursor mixture onto at least a portion of an outer surface of a glass container, the coating precursor mixture comprising one or more silazane monomeric units or prepolymers comprising silazane monomeric units; and
- heating the coating precursor mixture to form a cured coating on the outer surface of the glass container, the cured coating comprising one or more polysilazanes, where the cured coating comprises at least 30 wt. % of the one or more polysilazanes; and
- wherein the portion of the outer surface of the glass container with the cured coating retains a coefficient of friction of less than or equal to about 0.7 following a heat treatment at a temperature of at least about 250° C. for 30 minutes, wherein the coefficient of friction is a maximum coefficient of friction measured relative to a second pharmaceutical package in a vial-on-vial testing jig under a normal load of 30 N, the second pharmaceutical package formed from the same glass composition and comprising the same cured coating and subjected to the same environmental conditions prior to measurement of the coefficient of friction;
- a cured coating positioned over at least a portion of the first surface of the glass container, wherein the cured coating comprises one or more polysilazanes, and wherein the cured coating comprises greater than 30 wt. % of the one or more polysilazanes;
- wherein the portion of the first surface of the glass container with the cured coating retains a coefficient of friction of less than or equal to about 0.7 following a heat treatment at a temperature of at least about 250° C. for 30 minutes, wherein the coefficient of friction is a maximum coefficient of friction measured relative to a second pharmaceutical package in a vial-on-vial testing jig under a normal load of 30 N, the second pharmaceutical package formed from the same glass composition and comprising the same cured coating and subjected to the same environmental conditions prior to measurement of the coefficient of friction.

16. The method of claim 15, wherein the heating of the coating precursor mixture is in dry heat.

17. The method of claim 15, wherein the one or more polysilazanes comprise an organic moiety.

* * * * *

UNITED STATES PATENT AND TRADEMARK OFFICE
CERTIFICATE OF CORRECTION

| | | |
|---|---|---|
| PATENT NO. | : 11,724,963 B2 | Page 1 of 1 |
| APPLICATION NO. | : 16/858166 | |
| DATED | : August 15, 2023 | |
| INVENTOR(S) | : Therese Francoise Arliguie et al. | |

It is certified that error appears in the above-identified patent and that said Letters Patent is hereby corrected as shown below:

In the Specification

In Column 1, Line 8, delete "U.S." and insert -- U.S.C --.

In the Claims

In Column 23, Line 61, in Claim 1, delete "250°C" and insert -- 250° C. --.

In Column 25-26, Line 24 (Column 25), Lines 1-18 (Column 26), in Claim 15, delete "friction; a cured coating positioned over at least a portion of the first surface of the glass container, wherein the cured coating comprises one or more polysilazanes, and wherein the cured coating comprises greater than 30 wt. % of the one or more polysilazanes; wherein the portion of the first surface of the glass container with the cured coating retains a coefficient of friction of less than or equal to about 0.7 following a heat treatment at a temperature of at least about 250° C. for 30 minutes, wherein the coefficient of friction is a maximum coefficient of friction measured relative to a second pharmaceutical package in a vial-on-vial testing jig under a normal load of 30 N, the second pharmaceutical package formed from the same glass composition and comprising the same cured coating and subjected to the same environmental conditions prior to measurement of the coefficient of friction." and insert -- friction. --.

Signed and Sealed this
Thirteenth Day of January, 2026

John A. Squires
*Director of the United States Patent and Trademark Office*